(12) United States Patent
Sesko

(10) Patent No.: US 10,101,181 B1
(45) Date of Patent: Oct. 16, 2018

(54) LINEAR DISPLACEMENT SENSOR USING A POSITION SENSITIVE DETECTOR

(71) Applicant: Mitutoyo Corporation, Kanagawa-ken (JP)

(72) Inventor: David William Sesko, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 47 days.

(21) Appl. No.: 15/474,818

(22) Filed: Mar. 30, 2017

(51) Int. Cl.
*G01D 5/34* (2006.01)
*G01D 7/00* (2006.01)

(52) U.S. Cl.
CPC .................. *G01D 5/34* (2013.01); *G01D 7/00* (2013.01)

(58) Field of Classification Search
CPC .................................. G01D 5/34; G01D 7/00
USPC ......................................... 250/231.1–231.18
See application file for complete search history.

(56) References Cited

U.S. PATENT DOCUMENTS

| 4,338,722 A | 7/1982 | Delmas |
| 4,812,635 A | 3/1989 | Kaufmann et al. |
| 7,405,389 B2 * | 7/2008 | Dueweke ............. G06F 3/0317 250/208.2 |
| 7,894,079 B1 | 2/2011 | Altendorf et al. |
| 8,400,643 B2 * | 3/2013 | Atherton ............ G01D 5/34746 356/621 |

* cited by examiner

*Primary Examiner* — Seung C Sohn
(74) *Attorney, Agent, or Firm* — Seed Intellectual Property Law Group LLP

(57) ABSTRACT

A position sensing device comprises a frame, a guide bearing, a motion element, a position sensitive detector, a light source, and a position indicating emitter. The motion element is guided by the guide bearing over a measuring range along a measuring axis direction. The light source is configured to radiate source light. The position indicating emitter moves with the motion element. The position indicating emitter comprises an emitter material that absorbs source light and outputs excitation light from the emitter material to form a measurement spot on the position sensitive detector. The measurement spot moves along the sensing axis direction of the position sensitive detector corresponding to the position of the motion element along the measuring axis direction. The position sensitive detector outputs at least one signal in response to the measurement spot which is indicative of the position of the motion element along the measuring axis direction.

7 Claims, 3 Drawing Sheets

LINEAR DISPLACEMENT SENSOR USING A POSITION SENSITIVE DETECTOR

FIELD OF THE INVENTION

The present invention relates to linear displacement sensors, and more particularly, to a linear displacement configuration that generates desirable measurement signals using a position sensitive detector.

BACKGROUND OF THE INVENTION

Various displacement sensors are known that provide signals which are indicative of a position using a linear variable differential transformer (LVDT). This LVDT type of system may be regarded as capable of precise or ultra-precise measurement (e.g., precision at the level of one micron, or much better), particularly over limited measuring ranges (e.g., 10 mm, or 5 mm, or less). An LVDT may use a primary solenoidal coil which generates an induced current in two secondary solenoidal coils, and the magnitude of the current in each secondary coil depends on the position of a ferromagnetic core that moves axially inside the coils. When the secondary coils are connected in reverse series, the position of the ferromagnetic core may be determined based on a resulting differential signal.

In some applications, it is desirable to provide an optical displacement sensor which provides a linear displacement signal, in a precise manner analogous to that of LVDT-type sensors. One prior art system of this type is disclosed in U.S. Pat. No. 4,338,722 (the '722 patent) issued to Delmas, which is hereby incorporated herein by reference in its entirety. The '722 patent discloses a sensor with a light source, a detector comprising two photoreceiver detectors and a moving stem with an opening to transmit light from the light source to the detectors. The moving stem slides between two guides. A cover over the opening on the moving stem is designed to be substantially symmetrical with the contact tip at the stem end relative to the center point between the two guides, as a means of eliminating measurement sensitivity to mechanical play of the stem. However, the '722 patent fails to recognize certain errors that may be associated with the light source. Thus, the device of the '722 patent may suffer from undesirable signal nonlinearity and/or accuracy errors.

A superior light source configuration is disclosed in U.S. Pat. No. 4,812,635 (the '635 patent), issued to Kaufmann et al., which provides a means for homogenous illumination in a position sensing device. The device of the '635 patent includes a light source, two photodiodes and a moving diaphragm which contains an aperture. The two photodiodes produce a signal determined by the position of the light which passes to them from the light source through the aperture on the diaphragm. The means for homogenous illumination comprises a correction filter along the optical path, which in the preferred embodiment comprises a film negative exposed using the light source at its nominal spacing. Such a custom filter outputs illumination which nominally has a uniform intensity. However, although the '635 patent provides source light which is uniform in intensity along a measuring axis, certain other errors that may be associated with the light source remain unrecognized. Thus, like the '635 patent, the device of the '722 patent may also suffer from undesirable signal nonlinearity and/or accuracy errors.

It would be desirable to provide a precision optical position sensing device that is a simpler and lower-cost device than those outlined above, and which provides improved linearity and/or accuracy (e.g., relative to the devices of the '635 and '722 patents).

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A position sensing device comprises a frame, a guide bearing, a motion element, a position sensitive detector, a light source, and a position indicating emitter. The guide bearing is fixed relative to the frame. The motion element is guided by the guide bearing over a measuring range along a measuring axis direction. The position sensitive detector is fixed relative to the frame and comprises a photodetector configured to provide an output that is responsive to the position of a light spot along a sensing axis direction of the position sensitive detector. The light source is configured to radiate source light including a first wavelength range along a source light path, the light source comprising at least a light generating portion. The position indicating emitter is fixed relative to the motion element and moves with the motion element. The position indicating emitter comprises an emitter material that absorbs light in the first wavelength range and responds by outputting excitation light generated within the emitter material, the generated excitation light including a second wavelength range. The position indicating emitter is located to receive the source light along the source light path and output excitation light along a measurement spot path to form a measurement spot on the position sensitive detector, regardless of the position of the motion element within the measuring range. The measurement spot moves along the sensing axis direction of the position sensitive detector corresponding to the position of the motion element along the measuring axis direction. The position sensitive detector outputs at least one signal in response to the measurement spot, and the at least one signal is indicative of the position of the motion element along the measuring axis direction.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figures 1A, 1B:
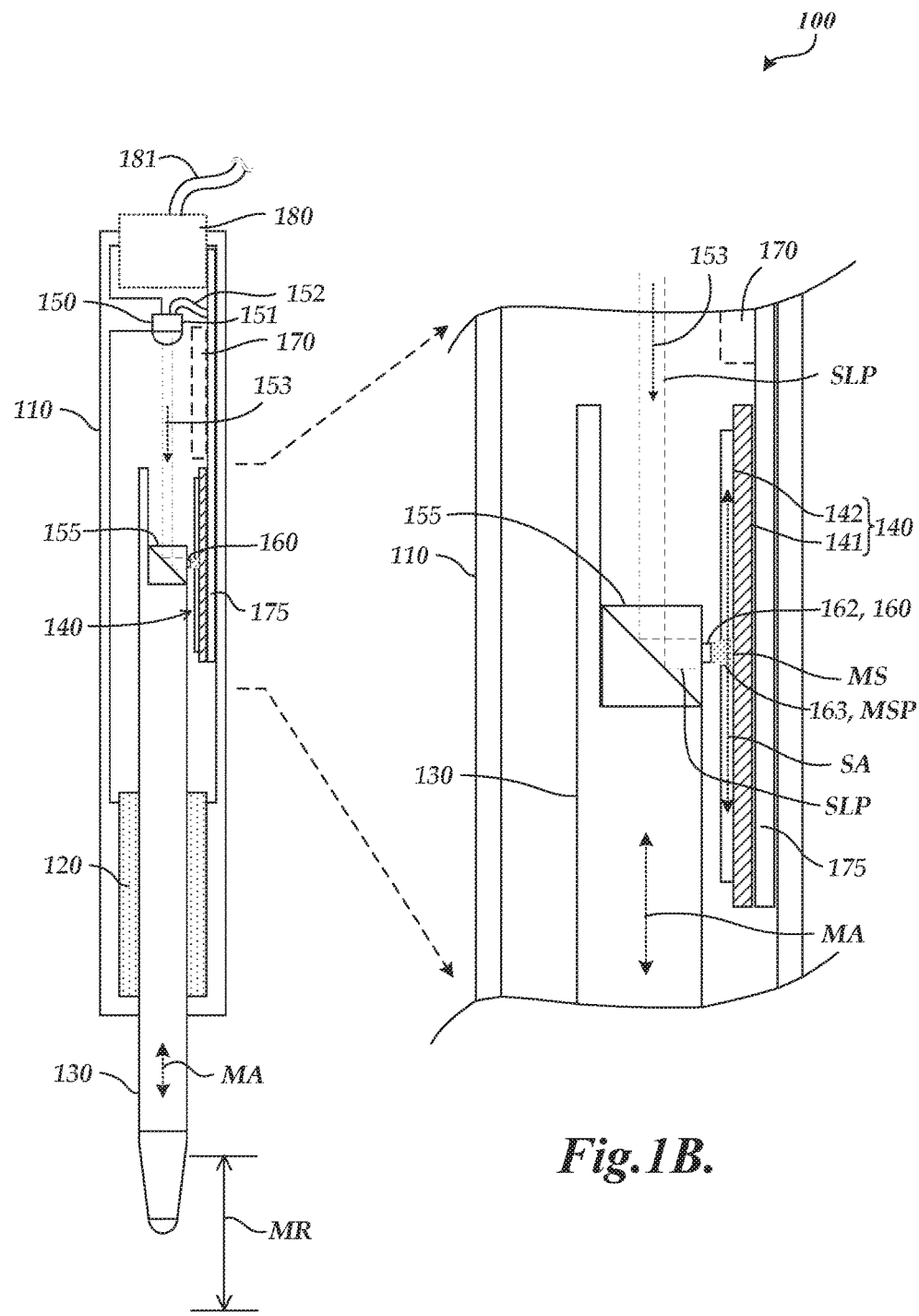
FIG. 1A and FIG. 1B are diagrams of a schematic cross-sectional view perpendicular to the measuring axis direction of a first implementation of a position sensing device.

FIG. 1A and FIG. 1B are diagrams of a schematic cross-sectional view perpendicular to the measuring axis direction of a first implementation of a position sensing device 100. FIG. 1B shows a zoomed-in portion of FIG. 1A.

The position sensing device 100 comprises a frame 110, a guide bearing 120, a motion element 130, a position sensitive detector 140, a light source 150, a position indicating emitter 160, a signal processing and control portion 170, and a connector 180. In some implementations, the position sensitive detector 140 and the signal processing and control portion 170 may be carried on and/or connected to a circuit board (or flex print) 175, which interconnects various elements of the position sensing device 100.

The guide bearing 120 is fixed relative to the frame 110. The motion element 130 is guided by the guide bearing 120 over a measuring range MR along a measuring axis direction MA. The position sensitive detector 140 is fixed relative to the frame 110 (e.g., through the circuit board 175) and comprises a photodetector 141 configured to provide an output that is responsive to the position of a light spot along a sensing axis direction SA of the position sensitive detector 140. The light source 150 comprises a light generating portion 151 (e.g., a laser diode, VCSEL, or LED, or the like), which may be connected to the circuit board 175 through a power connection 152. The light source 150 is configured to output source light 153 including a first wavelength range along a source light path SLP. The light source may be fixed relative to the frame 110 in various implementations (e.g., by mounting it to the frame or the circuit board 175.) In the implementation shown in FIG. 1A and FIG. 1B, the source light path is directed along the measuring axis direction MA and includes a deflector element 155 which is mounted on the motion element 130 and includes a reflective surface that turns the source light path toward the position indicating emitter 160.

The position indicating emitter 160 is fixed relative to the motion element 130 (e.g., it is fixed to a surface of the deflector element 155) and moves with the motion element 130. The position indicating emitter 160 is particularly simple in this implementation, and comprises an emitter material 162 (e.g., a phosphor-filled resin or the like that is fixed to a surface of the deflector element 155), which absorbs light in the first wavelength range and responds by outputting excitation light 163 generated within the emitter material 162. The generated excitation light 163 includes a second wavelength range. The position indicating emitter 160 is located to receive the source light 153 along the source light path SLP and output the excitation light 163 along a measurement spot path MSP to form a measurement spot MS on the position sensitive detector 140, regardless of the position of the motion element 130 within the measuring range MR. In this implementation, the size of the emitter material 162 may be relatively small and the distance between the emitter material 162 and the position sensitive detector 140 are made small such that the size of the measurement spot MS remains small, even in the absence of a lens or limiting aperture along the measurement spot path MSP. The position sensitive detector 140 also comprises a filter 142 configured to pass the second wavelength range and block other unwanted wavelengths from detection, including blocking at least the first wavelength range of the source light 153.

The measurement spot MS moves along the sensing axis direction SA of the position sensitive detector 140 corresponding to the position of the motion element 130 along the measuring axis direction MA. The position sensitive detector 140 outputs at least one signal in response to the measurement spot MS, and the at least one signal is indicative of the position of the motion element 130 along the measuring axis direction MA. The connector 180 is configured to connect output wires 181 to the signal processing and control portion 170. The signal processing and control portion 170 is configured to output position indicating signals based on the at least one signal from the position sensitive detector 140, to a host system, a display or the like.

In various implementations, the emitter material 162 may comprise one or more conventional phosphor materials such as YAG-Ce$^+$-based phosphors, or photoluminescent semiconductor nanoparticles or nanocrystals, or Q-particle phosphors (commonly called quantum dots or semiconductor quantum dots), or zinc oxide nanorods, or the like.

It should be appreciated that the emitter material 162 provides a measurement spot MS which maintains a relatively uniform intensity over the measuring range MR. As a result, undesirable errors resulting from intensity variations within the measurement spot MS may be significantly reduced.

In various implementations, the position sensitive detector may be a position sensitive detector that outputs two differential signals, and a relationship between the two signals may be indicative of the position of the motion element along the measuring axis direction. For example, in one embodiment, the position may be indicated by the relationship $(A-B)/(A+B)$, where A and B are the differential signals. Such a relationship tends to be relatively insensitive to variations in the average power in the measuring spot MS. Operations of such a position sensitive detector may be understood by U.S. Pat. No. 7,894,079, which is hereby incorporated by reference in entirety.

Figure 2:
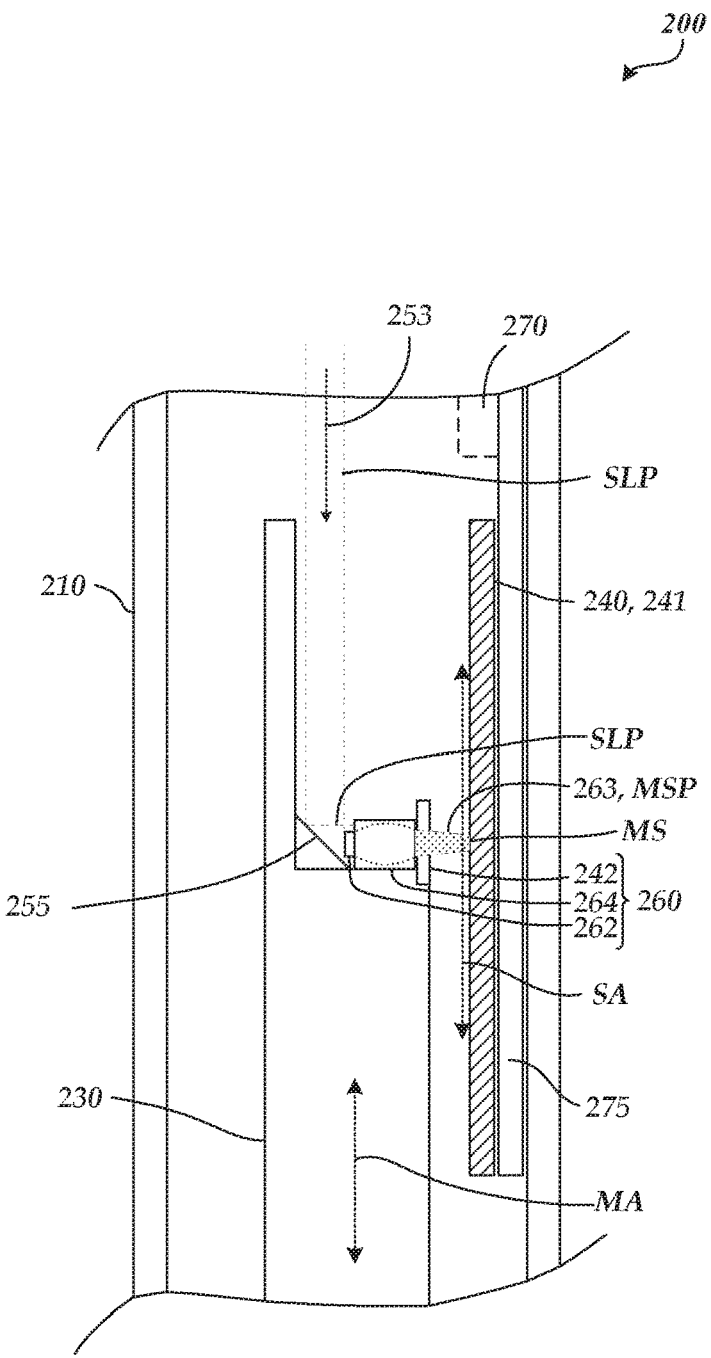
FIG. 2 is a diagram of a schematic cross-sectional view perpendicular to the measuring axis direction of a second implementation of a position sensing device.

FIG. 2 is diagram analogous to FIG. 1B, showing an arrangement of elements that can be used in place of those illustrated in FIG. 1B. In particular, FIG. 2 is diagram of a schematic cross-sectional view perpendicular to the measuring axis direction of a second implementation of a position sensing device 200. Various 2XX series numbers in FIG. 2 that have the same "XX" suffix as 1XX series numbers in FIG. 1A and FIG. 1B may designate similar or identical elements unless otherwise indicated. Thus, the operation of the position sensing device 200 may generally be understood by analogy with FIG. 1A and FIG. 1B, and only certain aspects and/or differences of operation will be described here.

The primary differences between FIG. 2 and FIG. 1B is that the position indicating emitter 260 includes more elements that the position indicating emitter 160, including a filter 242 that performs a function similar to the filter 142 which was described as part of the position sensitive detector 140.

As shown in FIG. 2, the position sensing device 200 comprises the position indicating emitter 260 which includes an emitter material 262, a gradient index lens 264, and the filter 242. In the implementation shown in FIG. 2 the source light path SLP is directed along the measuring axis direction MA and includes a deflector element 255 which is mounted on the motion element 230 and includes a reflective surface which turns the source light path SLP toward the position indicating emitter 260.

The position indicating emitter 260 is fixed relative to the motion element 230, and is an assembly in this implementation. In the illustrated implementation, the position indicating emitter 260 comprises the emitter material 262 (e.g., a phosphor-filled resin, or the like) fixed to an input surface of the gradient index lens 264, with the filter 242 fixed to an output surface of the gradient index lens 264. Similarly to a previous description, the emitter material 262 absorbs source light 253 in a first wavelength range and responds by outputting excitation light 263 generated within the emitter material 262 through the gradient index lens 264, which at least partially focuses the excitation light 263 along the measurement spot path MSP in order to form the measurement spot MS on the position sensitive detector 240. The generated excitation light 263 includes a second wavelength range. The filter 242 is configured to pass the second wavelength range and block other unwanted wavelengths from detection, including blocking at least the first wavelength range of the source light 153. The position indicating emitter 260 is located to receive the source light 253 along the source light path SLP, and output the excitation light 263 along a measurement spot path MSP to form a measurement spot MS on the position sensitive detector 240, regardless of the position of the motion element 230 within the measuring range MR.

Figure 3:
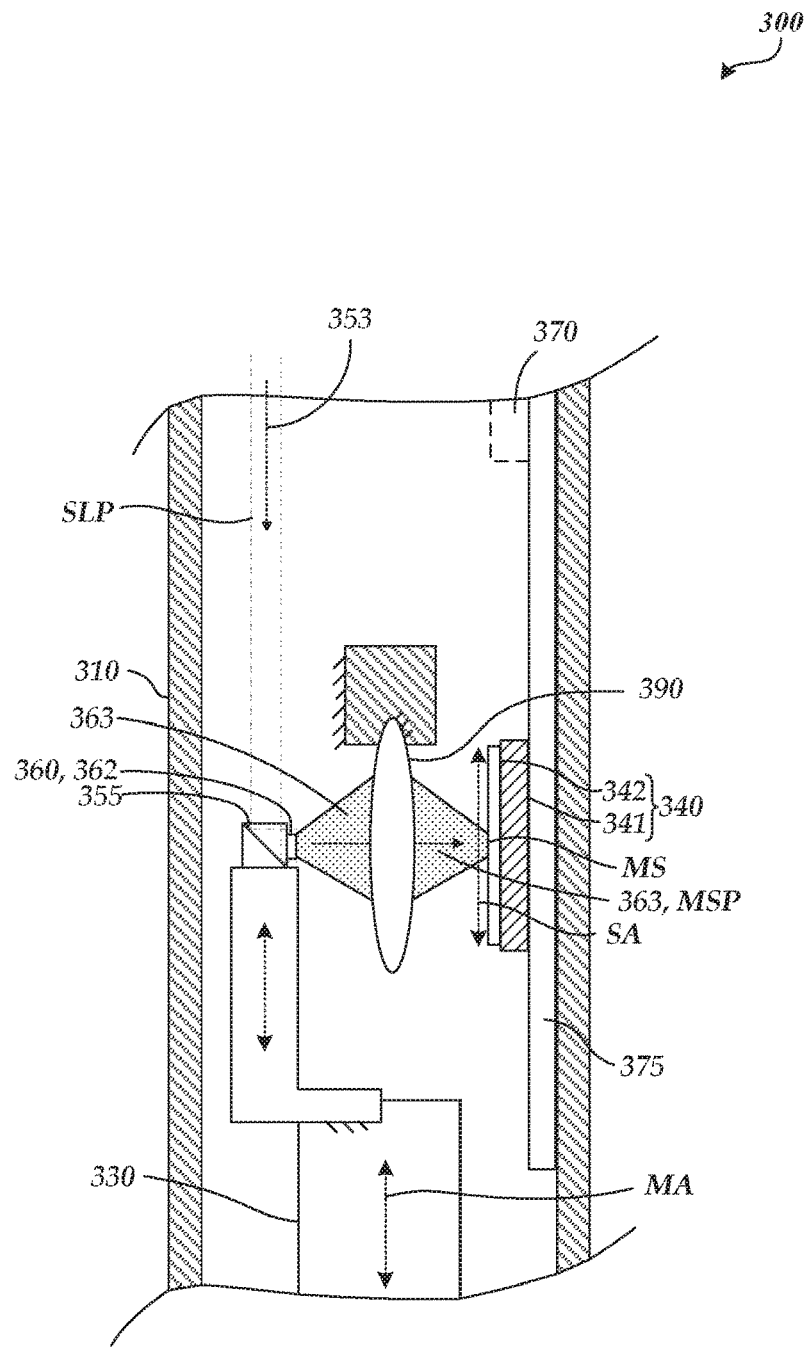
FIG. 3 is a diagram of a schematic cross-sectional view perpendicular to the measuring axis direction of a third implementation of a position sensing device.

FIG. 3 is diagram of a schematic cross-sectional view perpendicular to the measuring axis direction of a third implementation of a position sensing device 300. Various 3XX series numbers in FIG. 3 that have the same "XX" suffix as 1XX series numbers in FIG. 1A and FIG. 1B may designate similar or identical elements unless otherwise indicated. Thus, the operation of the position sensing device 300 may generally be understood by analogy with FIG. 1A and FIG. 1B, and only certain aspects of operation will be described here.

The primary difference between FIG. 3 and FIG. 1B is that the position indicating emitter 360 is farther from the position sensitive detector 340, in comparison to the position indicating emitter 160 and the position sensitive detector 140. Thus, a focusing lens configuration 390 is added along the measurement spot path MSP, to at least partially focus the excitation light 363 along the measurement spot path MSP in order to form a desired size of measurement spot MS on the position sensitive detector 340. In some embodiments, the focusing lens configuration 390 may comprise a limiting aperture (not shown) that blocks unwanted rays of the excitation light 363 according to known principles, and helps control the size of the measurement spot MS. In some embodiments the focusing lens configuration 390 may comprise a telecentric imaging configuration that images the position indicating emitter 360 (e.g., the emitter material 362) onto the position sensitive detector 340 to form the measurement spot MS according to known telecentric imaging principles.

Otherwise, the position sensing device 300 may be understood to operate similarly to the position sensing device 100.

The position indicating emitter 360 is located to receive the source light 353 along the source light path SLP and output the excitation light 363 along a measurement spot path MSP, and the focusing lens configuration 390 is configured to be large enough along the measuring axis direction that it can form the measurement spot MS on the position sensitive detector 340, regardless of the position of the motion element 330 within the measuring range MR.

While preferred implementations of the present disclosure have been illustrated and described, numerous variations in the illustrated and described arrangements of features and sequences of operations will be apparent to one skilled in the art based on this disclosure. Various alternative forms and combinations of disclosed elements and/or operations may be used to implement the principles disclosed herein. For example, depending on the size of a position sensing device, additional deflectors or reflectors may be used to turn to the source light path and/or the measurement spot path in different directions, and the light source and position sensitive detector and/or other components may be reoriented and/or repositioned accordingly. The light source may be provided by the end of a fiber optic element routed inside and/or extending outside to a light generator outside the position sensing device, in some implementations. The position sensitive detector may comprise a position sensing array, or a photodetector comprising a shaped mask or aperture that blocks a portion of the measuring spot depending on its position relative to the shaped mask or aperture.

The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A position sensing device comprising:
   a frame;
   a guide bearing that is fixed relative to the frame;
   a motion element that is guided by the guide bearing over a measuring range along a measuring axis direction;
   a position sensitive detector which is fixed relative to the frame and which comprises a photodetector configured to provide an output that is responsive to a position of a light spot along a sensing axis direction of the position sensitive detector,
   a light source configured to radiate source light including a first wavelength range along a source light path, the light source comprising at least a light generating portion; and
   a position indicating emitter which is fixed relative to the motion element and moves with the motion element, wherein:
      the position indicating emitter comprises an emitter material that absorbs light in the first wavelength range and responds by outputting excitation light generated within the emitter material, the generated excitation light including a second wavelength range;
      the position indicating emitter is located to receive the source light along the source light path and output the excitation light along a measurement spot path to form a measurement spot on the position sensitive detector, regardless of a position of the motion element within the measuring range;
      the measurement spot moves along the sensing axis direction of the position sensitive detector corresponding to the position of the motion element along the measuring axis direction; and
      the position sensitive detector outputs at least one signal in response to the measurement spot, and the at least one signal is indicative of the position of the motion element along the measuring axis direction.

2. The position sensing device of claim 1, wherein the position indicating emitter material comprises one of phosphor material, photoluminescent semiconductor nanoparticles, nanocrystals, quantum dots, or nanorods.

3. The position sensing device of claim 1, wherein the position indicating emitter comprises a gradient-index lens arranged to focus the excitation light to form the measurement spot on the position sensitive detector.

4. The position sensing device of claim 1, further comprising a lens fixed to the frame between the position sensitive detector and the position indicating emitter, which is configured to focus the excitation light to form the measurement spot on the position sensitive detector.

5. The position sensing device of claim 1, further comprising a filter configured to filter the source light from the measurement spot on the position sensitive detector.

6. The position sensing device of claim 5, wherein the filter is part of the position indicating emitter.

7. The position sensing device of claim 5, wherein the filter is part of the position sensitive detector.

\* \* \* \* \*